United States Patent
Tokairin et al.

(10) Patent No.: US 10,224,842 B2
(45) Date of Patent: Mar. 5, 2019

(54) CONTROL DEVICE AND BRUSHLESS MOTOR

(71) Applicant: FUJI XEROX CO., LTD., Tokyo (JP)

(72) Inventors: Motohiro Tokairin, Kanagawa (JP); Toyohiko Hoshino, Kanagawa (JP); Yukitoshi Takano, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 21 days.

(21) Appl. No.: 15/698,828

(22) Filed: Sep. 8, 2017

(65) Prior Publication Data
US 2018/0205330 A1    Jul. 19, 2018

(30) Foreign Application Priority Data
Jan. 16, 2017 (JP) .................. 2017-005345

(51) Int. Cl.
*H02P 6/08* (2016.01)
*H02P 6/17* (2016.01)

(52) U.S. Cl.
CPC . *H02P 6/08* (2013.01); *H02P 6/17* (2016.02)

(58) Field of Classification Search
CPC .................... H02P 6/08; H02P 6/17
USPC .................................. 318/400.19
See application file for complete search history.

(56) References Cited

U.S. PATENT DOCUMENTS

2017/0253267 A1*  9/2017  Woodruff ............. B62D 5/0481
2018/0254722 A1*  9/2018  Umetsu ................... H02P 6/186

FOREIGN PATENT DOCUMENTS

JP            7-87779 A      3/1995
JP         2001-218493 A     8/2001

* cited by examiner

*Primary Examiner* — Kawing Chan
(74) *Attorney, Agent, or Firm* — Sughrue Mion, PLLC

(57) ABSTRACT

A control device includes an obtaining unit that obtains rotation information indicating an amount of rotation and a rotation direction of a rotor of a brushless motor; and a controller that specifies a current to be provided to a coil of the brushless motor to control a rotating magnetic field generated by the coil by performing change control for gradually changing an electrical angle of the rotating magnetic field, detecting, as an initial position of the rotor, a position in which the rotor faces magnetic poles generated at an electrical angle when the rotation direction obtained during the change control changes from a first direction to a second direction and a difference between the amount of rotation in the first direction and that in the second direction obtained during the change control becomes smaller than a first threshold, and controlling the rotating magnetic field in accordance with the initial position.

12 Claims, 15 Drawing Sheets

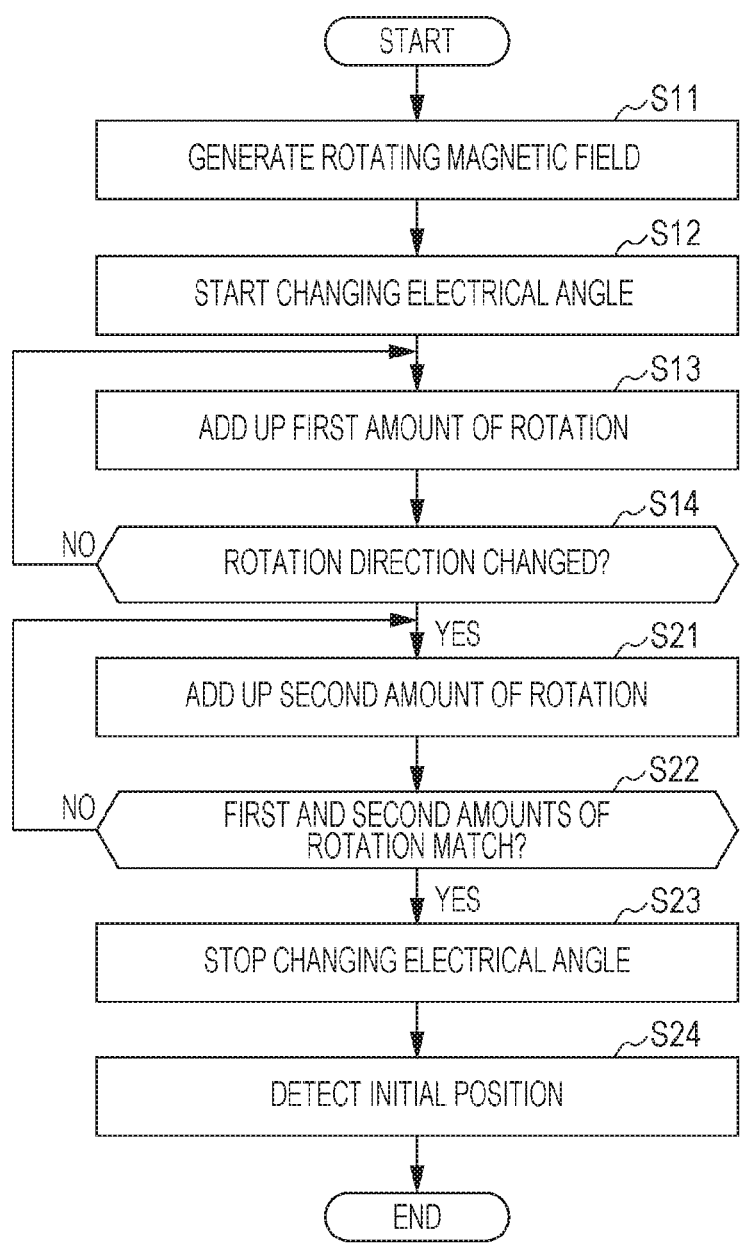

| INCREASE RATE OF FIRST AMOUNT OF ROTATION | d-AXIS CURRENT AT TIME t2 (A) |
|---|---|
| SMALLER THAN Th11 | X43 |
| EQUAL TO OR LARGER THAN Th11 AND SMALLER THAN Th12 | X42 |
| EQUAL TO OR LARGER THAN Th12 | X41 |

FIG. 15

| INCREASE RATE OF FIRST AMOUNT OF ROTATION | AMOUNT-OF-ROTATION THRESHOLD |
|---|---|
| SMALLER THAN Th11 | Th53 |
| EQUAL TO OR LARGER THAN Th11 AND SMALLER THAN Th12 | Th52 |
| EQUAL TO OR LARGER THAN Th12 | Th51 |

FIG. 16

| INCREASE RATE OF FIRST AMOUNT OF ROTATION | DIFFERENCE THRESHOLD |
|---|---|
| SMALLER THAN Th11 | Th63 |
| EQUAL TO OR LARGER THAN Th11 AND SMALLER THAN Th12 | Th62 |
| EQUAL TO OR LARGER THAN Th12 | Th61 |

US 10,224,842 B2

CONTROL DEVICE AND BRUSHLESS MOTOR

CROSS-REFERENCE TO RELATED APPLICATIONS

This application is based on and claims priority under 35 USC 119 from Japanese Patent Application No. 2017-005345 filed Jan. 16, 2017.

BACKGROUND

Technical Field

The present invention relates to a control device and a brushless motor.

SUMMARY

According to an aspect of the invention, there is provided a control device including an obtaining unit and a controller. The obtaining unit obtains rotation information indicating an amount of rotation and a rotation direction of a rotor of a brushless motor. The controller specifies a current that is provided to a coil of the brushless motor to control a rotating magnetic field generated by the coil in such a manner as to perform change control for gradually changing an electrical angle of the rotating magnetic field generated by the coil, to detect, as an initial position of the rotor, a position in which the rotor faces magnetic poles that are generated at an electrical angle when the rotation direction indicated by the rotation information that is obtained during the change control changes from a first direction to a second direction and a difference between an amount of rotation in the first direction and an amount of rotation in the second direction, the amounts of rotation being indicated by the rotation information that is obtained during the change control, becomes smaller than a first threshold, and to control the rotating magnetic field in accordance with the initial position.

BRIEF DESCRIPTION OF THE DRAWINGS

An exemplary embodiment of the present invention will be described in detail based on the following figures, wherein:

FIG. 8 is a flowchart illustrating an example operation procedure of the motor control device in a detection process;

FIG. 15 is a diagram illustrating an example of an amount-of-rotation threshold table;

FIG. 16 is a diagram illustrating an example of a difference threshold table;

DETAILED DESCRIPTION

1. Exemplary Embodiment

Figure 1:
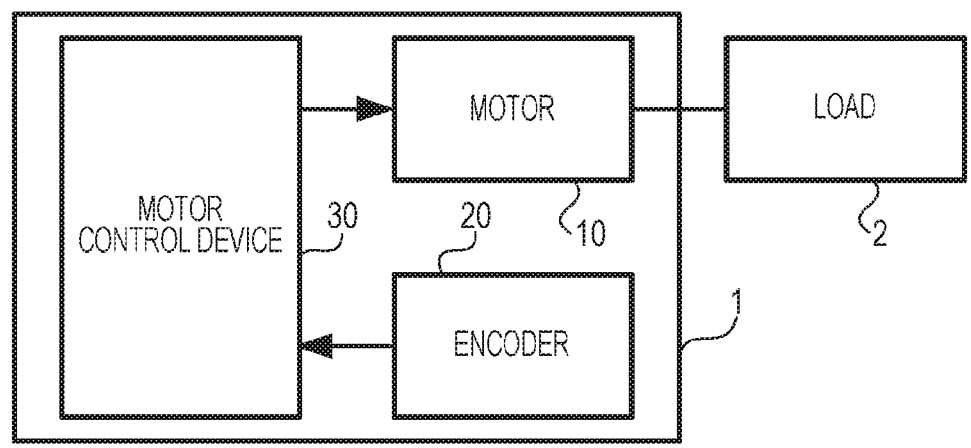
FIG. 1 is a diagram illustrating an overall configuration of a brushless motor according to an exemplary embodiment.

FIG. 1 illustrates an overall configuration of a brushless motor 1 according to an exemplary embodiment. The brushless motor 1 is a motor including a permanent magnet that is used as a rotor and plural coils that are arranged around the rotor and are used as stators. In the brushless motor 1, a current that is provided to each of the coils is changed to generate a rotating magnetic field and to rotate the rotor.

The brushless motor 1 includes a motor 10, an encoder 20, and a motor control device 30. The motor 10 includes the rotor and stators described above and a rotating shaft fixed to the rotor, and rotates the rotating shaft. To the rotating shaft, a load 2 is attached. The load 2 is constituted by mechanical elements, such as a gear, a cam, a roller, and so on and rotates in conjunction with the rotating shaft to transmit power. The encoder 20 is a device that outputs a rotation signal indicating the rotation direction and the amount of rotation of the rotor.

The encoder 20 is a light-transmissive encoder. In the encoder 20, a disc having slits that are provided along the circumference at equal intervals is rotated in conjunction with the rotor, and a sensor that receives light passing through the slits outputs, from channels of two systems, namely, an A-phase and a B-phase, pulses that indicate the rotation direction and the amount of rotation (the rotation direction is determined on the basis of whether the A-phase or the B-phase rises first, and the amount of rotation is represented by the number of pulses per unit time) as a rotation signal. The motor control device 30 is a computer that uses the rotation signal output from the encoder 20 to control the rotation of the motor 10 (specifically, the rotation of the rotor).

Figure 2:
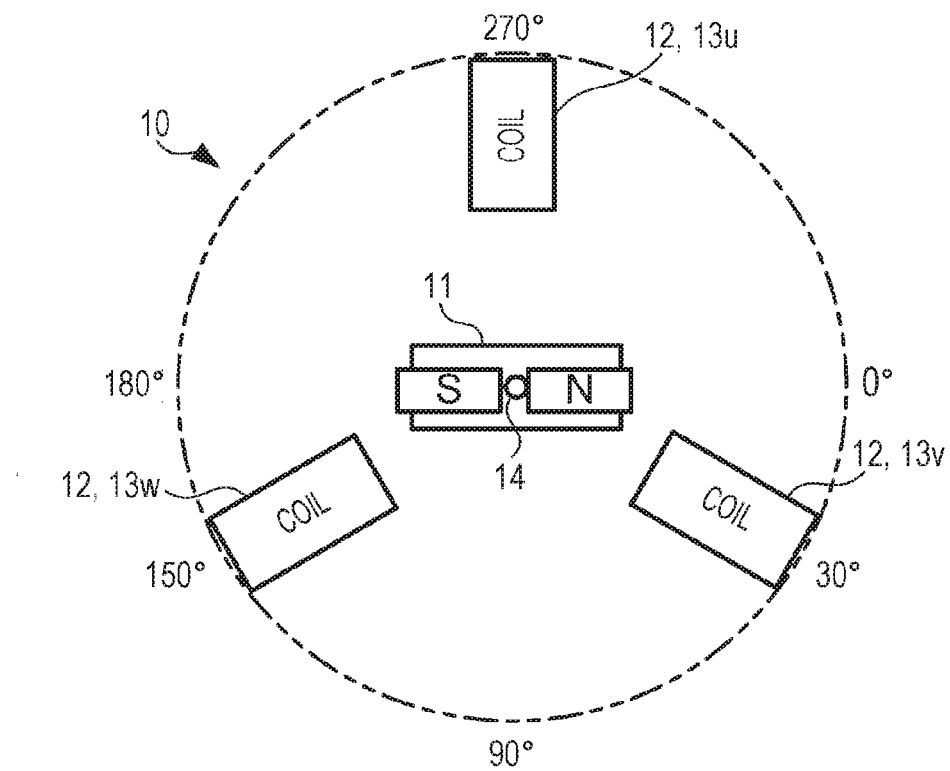
FIG. 2 is a diagram illustrating a configuration of a motor.

FIG. 2 illustrates a configuration of the motor 10. The motor 10 includes a rotor 11 and stators 12. To the rotor 11, a rotating shaft 14 is fixed. The rotor 11 is a permanent magnet that has a set of magnetic poles (the north pole and the south pole). The stators 12 are constituted by three coils 13 (13u, 13v, and 13w). The coils 13 are arranged at positions such that the directions from the rotating shaft 14 to the coils 13 shift from each other by 120 degrees.

Hereinafter, for convenience of description, the direction in which the coil 13u is arranged is referred to as a direction of 270 degrees (also referred to as an upward direction), the opposite direction is referred to as a direction of 90 degrees (also referred to as a downward direction), one of the directions that make an angle of 90 degrees with the directions of 270 degrees and 90 degrees closer to the coil 13w is referred to as a direction of 180 degrees (also referred to as a left direction), and the other direction closer to the coil 13v is referred to as a direction of 0 degree (also referred to as a right direction) while the rotating shaft 14 is assumed to be the center.

When description is given by using the angles that indicate the directions described above, the coil 13u is arranged in the direction of 270 degrees, the coil 13v is arranged in a direction of 30 degrees, and the coil 13w is arranged in a direction of 150 degrees. The motor 10 is a three-phase motor in which three-phase (U-phase, V-phase, and W-phase) currents having phases that shift from each other by 120 degrees are provided to the three coils 13 to thereby rotate the rotor 11.

Figure 3:
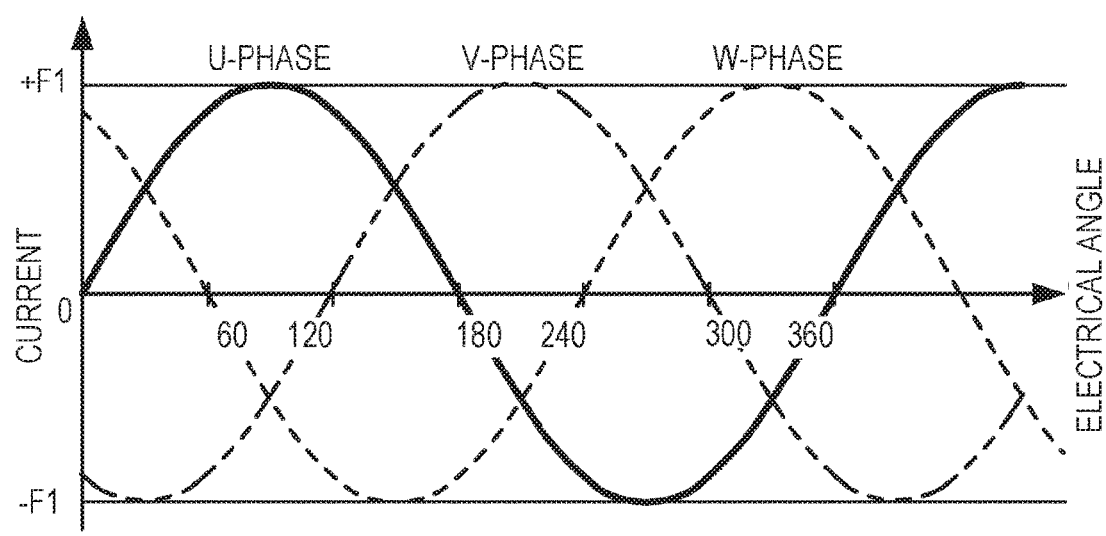
FIG. 3 is a diagram illustrating example three-phase currents.

FIG. 3 illustrates example three-phase currents. FIG. 3 illustrates a graph in which the vertical axis represents the current value (A: ampere) and the horizontal axis represents the electrical angle (degree). The electrical angle represents the phase. That is, when one cycle of a sine-wave current is assumed to correspond to 360 degrees ($2\pi$ radian), the electrical angle represents the position in the cycle. In this example, the current value of the U-phase current (the current provided to the coil 13u) is "0" at an electrical angle of 0 degree, "+F1" at 90 degrees, "0" at 180 degrees, "−F1" at 270 degrees, and "0" again at 360 degrees.

The current value of the V-phase current (the current provided to the coil 13v) is "−F1" at an electrical angle of 30 degrees, "0" at 120 degrees, "+F1" at 210 degrees, "0" at 300 degrees, and "−F1" again at 390 degrees. The current value of the W-phase current (the current provided to the coil 13w) is "0" at an electrical angle of 60 degrees, "−F1" at 150 degrees, "0" at 240 degrees, "+F1" at 330 degrees, and "0" again at 450 degrees. In a case where the three-phase currents illustrated in FIG. 3 are provided to the coils 13, the rotor 11 rotates as follows.

Figure 4A:
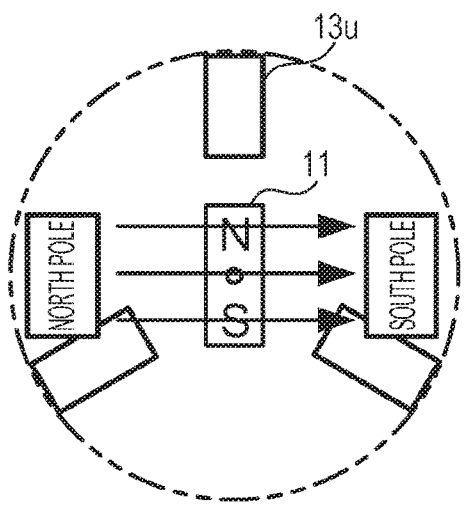
FIGS. 4A to 4C are diagrams illustrating a state where a rotor rotates.
Figure 4B:
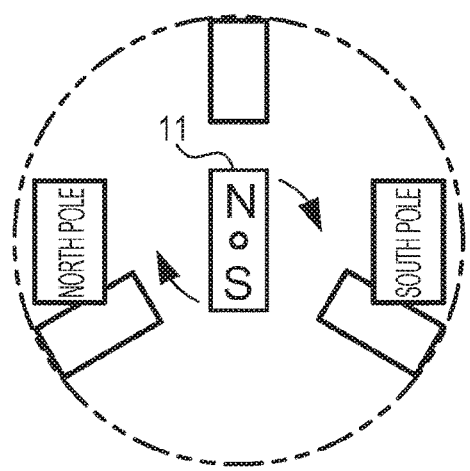
Figure 4C:
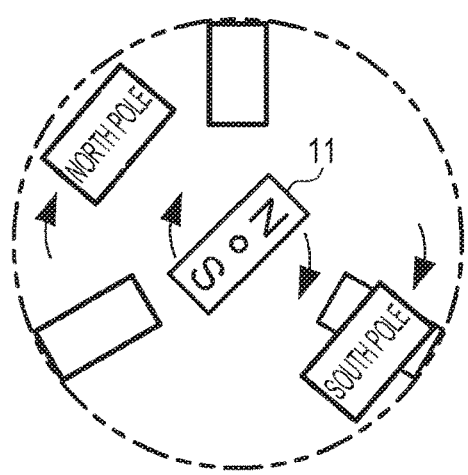

FIGS. 4A to 4C illustrate a state where the rotor 11 rotates. FIG. 4A illustrates a magnetic field that is generated when the currents at an electrical angle of 0 degree illustrated in FIG. 3 flow through the coils 13a, the magnetic field having the north pole in the direction of 180 degrees (left direction) and the south pole in the direction of 0 degree (right direction), the directions being as illustrated in FIG. 2. In this example, the north pole of the rotor 11 points in the direction of 270 degrees (upward direction), and the south pole thereof points in the direction of 90 degrees (downward direction).

In this case, the north pole of the rotor 11 is attracted to the south pole of the magnetic field, and the south pole of the rotor 11 is attracted to the north pole of the magnetic field, as illustrated in FIG. 4B. Therefore, the rotor 11 starts rotating clockwise. Here, "clockwise" corresponds to a direction from the coil 13u toward the coil 13w via the coil 13v (a direction in which the angle that indicates the direction as illustrated in FIG. 2 increases).

The rotor 11 rotates, and the electrical angle of the three-phase currents changes. Accordingly, the north pole and the south pole of the magnetic field generated by the currents that flow through the coils 13 rotate as illustrated in FIG. 4C. Such a magnetic field having the north pole and the south pole that rotates as described above is called a rotating magnetic field. The north pole and the south pole of the rotor 11 are continuously attracted to the south pole and the north pole of the rotating magnetic field respectively, and the rotor 11 rotates accordingly. The currents that flow through the coils 13 are controlled by the motor control device 30. The motor control device 30 includes hardware units, such as a microprocessor, and the hardware units are used to implement the functions illustrated in FIG. 5.

Figure 5:
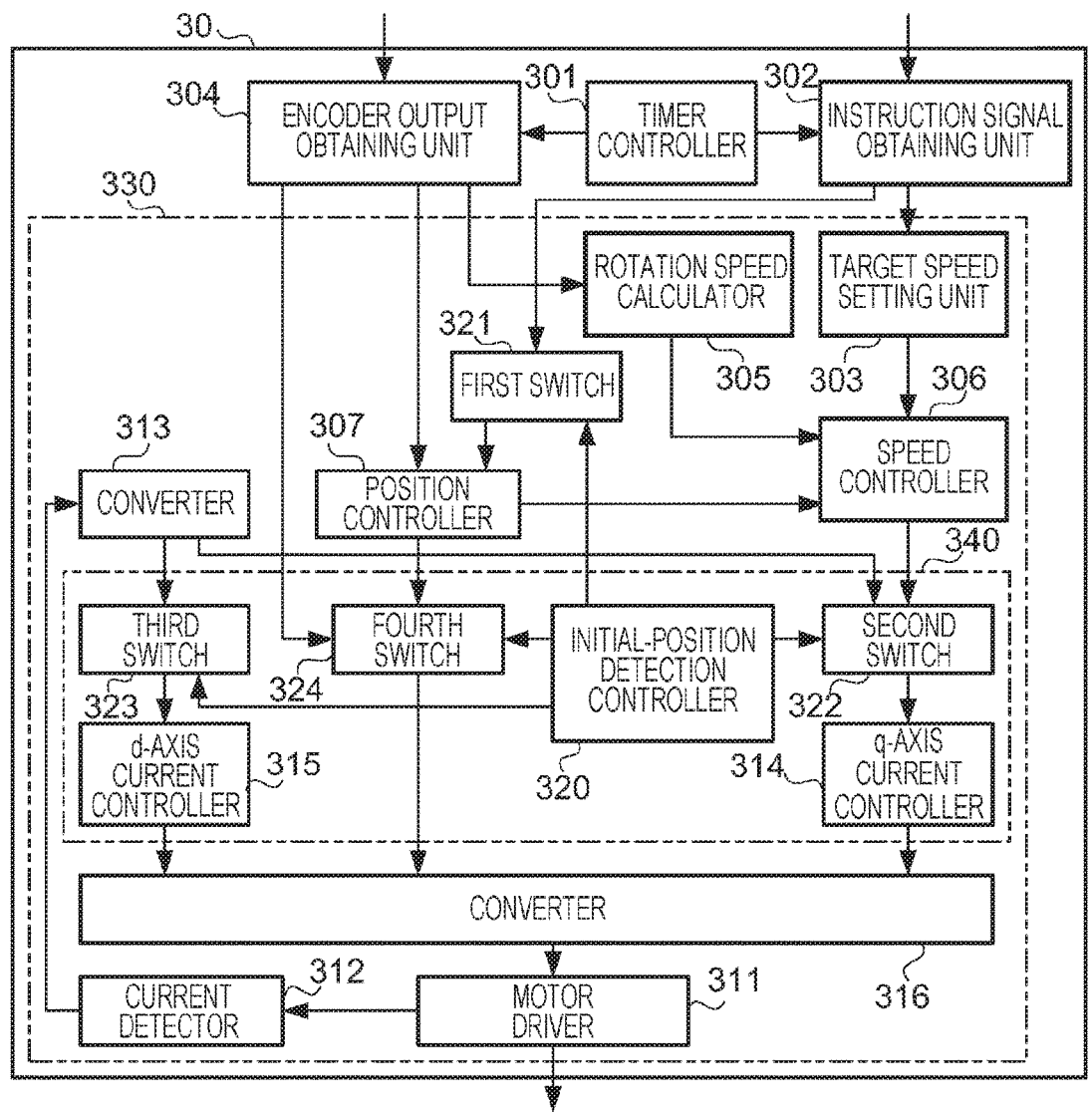
FIG. 5 is a diagram illustrating a functional configuration of a motor control device.

FIG. 5 illustrates a functional configuration of the motor control device 30. The motor control device 30 includes a timer controller 301, an instruction signal obtaining unit 302, a target speed setting unit 303, an encoder output obtaining unit 304, a rotation speed calculator 305, a speed controller 306, a position controller 307, a motor driver 311, a current detector 312, a converter 313, a q-axis current controller 314, a d-axis current controller 315, a converter 316, an initial-position detection controller 320, a first switch 321, a second switch 322, a third switch 323, and a fourth switch 324.

The brushless motor 1 does not include a sensor that detects the position of the rotor 11 (in this exemplary embodiment, the position is represented by a direction in which the north pole points). Therefore, in the brushless motor 1, initial-position detection control for detecting the initial position of the rotor 11 (the position at the time of turning on the power) is first performed after turning on the power and, after detecting the initial position, usual rotation control is performed. A functional group that performs the usual rotation control is first described below.

The timer controller 301 generates a signal having a predetermined cycle and supplies the signal to the instruction signal obtaining unit 302 and to the encoder output obtaining unit 304. To the instruction signal obtaining unit 302, an instruction signal indicating the rotation direction and rotation speed or the rotation position (a position at which the rotor 11 is to be stopped) is input from an external device, and the instruction signal obtaining unit 302 obtains an instruction signal that is input during a period from when a signal is supplied from the timer controller 301 until when the next signal is supplied from the timer controller 301. The external device described here is, for example, a device that controls the operations of the load 2.

The instruction signal obtaining unit 302 supplies the obtained instruction signal to the target speed setting unit 303, and supplies the obtained instruction signal to the position controller 307 via the first switch 321. The target speed setting unit 303 sets the rotation speed indicated by the instruction signal supplied from the instruction signal obtaining unit 302 as a target speed and supplies the set target speed to the speed controller 306.

To the encoder output obtaining unit 304, a rotation signal output from the encoder 20 illustrated in FIG. 1 is input. The encoder output obtaining unit 304 obtains a rotation signal that is input during a period from when a signal is supplied from the timer controller 301 until when the next signal is supplied from the timer controller 301, and supplies the obtained rotation signal to the rotation speed calculator 305 and to the position controller 307. The encoder output obtaining unit 304 supplies the obtained rotation signal to the converter 316 via the fourth switch 324. The rotation signal is an example of "rotation information" that indicates the amount of rotation and the rotation direction of the rotor 11 in exemplary embodiments of the present invention, and the encoder output obtaining unit 304 is an example of an "obtaining unit" that obtains rotation information in exemplary embodiments of the present invention.

The rotation speed calculator 305 uses the rotation signal supplied from the encoder output obtaining unit 304 to calculate the rotation speed of the rotor 11. The rotation speed calculator 305 calculates the rotation speed from the number of pulses per unit time indicated by the rotation signal, for example. The calculated rotation speed corresponds to a measurement value of the current rotation speed of the rotor 11. The rotation speed calculator 305 supplies the calculated rotation speed to the speed controller 306.

The speed controller 306 performs speed control for making the rotation speed of the rotor 11 supplied from the rotation speed calculator 305 closer to the target speed set by the target speed setting unit 303. The speed controller 306 performs speed control by using, for example, a proportional-integral (PI) control algorithm, which is one of the feedback control algorithms.

The speed controller 306 supplies an instruction value (a value that corresponds to the calculated rotation speed and the target speed) of a q-axis current among two-axis currents, which are obtained by converting the three-phase currents that flow through the coils 13, to the q-axis current controller 314 described below via the second switch 322, and makes the q-axis current controller 314 perform control to make a value obtained by converting the measured currents that flow through the coils 13 to the q-axis current closer to the instruction value, thereby making the rotation speed closer to the target speed.

The position controller 307 performs position control for making the position of the rotor 11 closer to the target position by using, for example, a proportional (P) control algorithm. In the usual rotation control, the initial position of the rotor 11 has been detected. The position controller 307 detects the current position of the rotor 11 from the detected initial position and the rotation direction and amount of rotation indicated by the rotation signal supplied from the encoder output obtaining unit 304.

The position controller 307 calculates the error between the rotation position (a position at which the rotor 11 is to be stopped) indicated by the instruction signal supplied from the instruction signal obtaining unit 302 via the first switch 321 and the detected current position of the rotor 11. The position controller 307 repeatedly supplies the calculated error to the speed controller 306 and makes the speed controller 306 perform control to set the speed to zero when the error becomes zero, thereby making the rotor 11 stop at the rotation position.

The motor driver 311 provides a function of controlling the three-phase currents that flow through the coils 13 of the motor 10 illustrated in FIG. 1, and is implemented by using, for example, a field-effect transistor (FET). The current detector 312 monitors the motor driver 311 and detects three-phase (U-phase, V-phase, and W-phase) currents iu, iv, and iw that flow through the coils 13. The current detector 312 supplies the detected currents to the converter 313.

The converter 313 converts the three-phase currents iu, iv, and iw supplied from the current detector 312 to currents iα and iβ of two-phase orthogonal stationary coordinates by performing a Clarke transform. The converter 313 further converts the stationary coordinates of the currents iα and iβ to rotating coordinates by performing a Park transform and obtains a d-axis current id and a q-axis current iq. The converter 313 supplies the q-axis current iq thus obtained to the q-axis current controller 314 via the second switch 322 and supplies the d-axis current id thus obtained to the d-axis current controller 315 via the third switch 323.

The q-axis current controller 314 performs control for making the q-axis current iq supplied from the converter 313 closer to the instruction value of the q-axis current supplied from the speed controller 306 by using, for example, a PI control algorithm. The q-axis current controller 314 supplies an instruction value of the q-axis voltage calculated from the q-axis current iq and the instruction value of the q-axis current to the converter 316. The d-axis current controller 315 performs control for making the d-axis current id supplied from the converter 313 closer to an instruction value of the d-axis current supplied from an external device via the third switch 323 by using, for example, a PI control algorithm. The d-axis current controller 315 supplies an instruction value of the d-axis voltage calculated from the d-axis current id and the instruction value of the d-axis current to the converter 316.

The converter 316 calculates the current electrical angle from the rotation direction and amount of rotation indicated by the rotation signal supplied from the encoder output obtaining unit 304 and from the initial position of the rotor 11 in a case where the initial position of the rotor 11 has been detected. The converter 316 uses the calculated electrical angle to convert the instruction value of the q-axis voltage supplied from the q-axis current controller 314 and the instruction value of the d-axis voltage supplied from the d-axis current controller 315 to three-phase (U-phase, V-phase, and W-phase) voltage coordinates by performing a spatial vector transform.

Further, the converter 316 converts the three-phase voltage coordinates to a voltage signal indicating voltages that are represented on the basis of the pulse width modulation (PWM) technique (a technique for applying a voltage proportional to the pulse width of an ON pulse among pulses formed by repeatedly turning on and off the voltage), and supplies the voltage signal to the motor driver 311. The motor driver 311 applies the voltages indicated by the supplied voltage signal to the coils 13 to thereby control the three-phase currents that flow through the coils 13.

Now, a functional group that performs initial-position detection control is described. The initial-position detection controller 320 performs initial-position detection control for detecting the initial position of the rotor 11. The initial-position detection controller 320 controls the first switch 321, the second switch 322, the third switch 323, and the fourth switch 324 to switch information that is supplied to the downstream functions of the switches in the case of the usual rotation control and in the case of the initial-position detection control.

The initial-position detection controller 320 controls the first switch 321 to make the first switch 321 supply the instruction signal obtained by the instruction signal obtaining unit 302 to the downstream unit, that is, the position controller 307, in the case of the usual rotation control. In the case of the initial-position detection control, the initial-position detection controller 320 supplies an initial instruction signal that indicates the initial position as the target position to the position controller 307 via the first switch 321. When the initial instruction signal is supplied, the position controller 307 performs position control so as to return the position of the rotor 11 to the initial position in a case where the rotor 11 has rotated from the initial position.

The initial-position detection controller 320 controls the second switch 322 to make the second switch 322 supply the instruction value of the q-axis current from the speed controller 306 and the q-axis current iq from the converter 313 to the downstream unit, that is, the q-axis current controller 314, in the case of the usual rotation control. In the case of the initial-position detection control, the initial-position detection controller 320 supplies an instruction value for setting the current value of the q-axis current to zero to the q-axis current controller 314 via the second switch 322.

The initial-position detection controller 320 controls the third switch 323 to make the third switch 323 supply the instruction value of the d-axis current from the external device and the d-axis current id from the converter 313 to the downstream unit, that is, the d-axis current controller 315, in the case of the usual rotation control. In the case of the initial-position detection control, the initial-position detection controller 320 supplies an instruction value for setting the current value of the d-axis current to a predetermined value (X (ampere) in this exemplary embodiment) to the d-axis current controller 315 via the third switch 323.

The initial-position detection controller 320 controls the fourth switch 324 to make the fourth switch 324 supply the rotation signal from the encoder output obtaining unit 304 to the downstream unit, that is, the converter 316, in the case of the usual rotation control. In the case of the initial-position detection control, the initial-position detection controller 320 supplies an instruction value for gradually changing the electrical angle to the converter 316 via the fourth switch 324. In a case where the initial-position detection controller 320 performs the control operations described above, the d-axis current, the electrical angle, the amount of rotation, and the position of the rotor 11 change, which is described with reference to FIGS. 6A to 6D and FIGS. 7A to 7C.

Figure 6A:
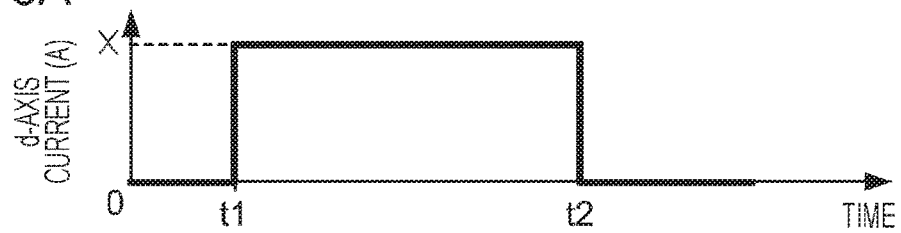
FIGS. 6A to 6D are diagrams illustrating example changes in a d-axis current and so on in initial-position detection control.
Figure 6B:
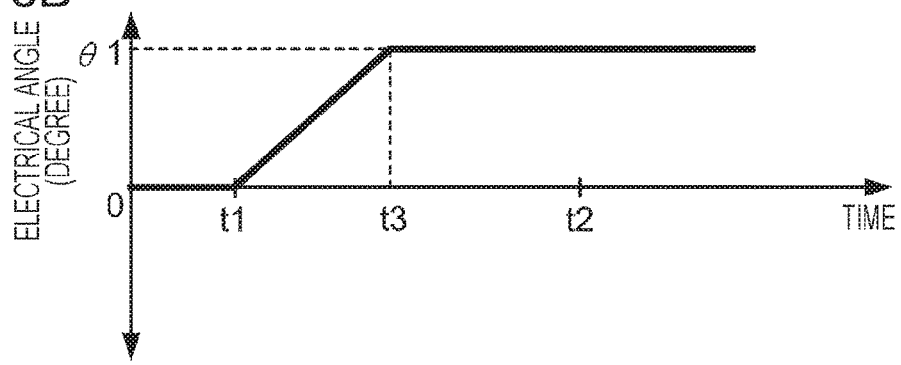
Figure 6C:
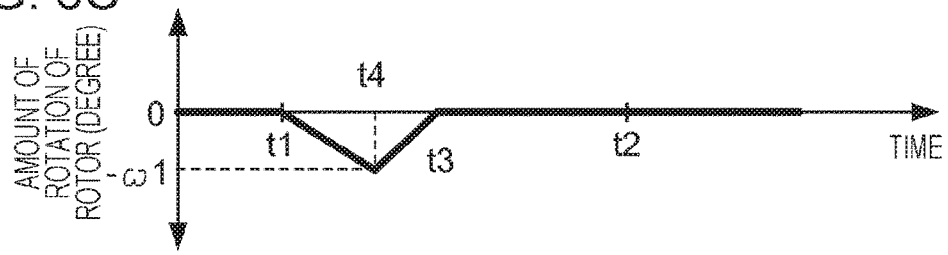
Figure 6D:
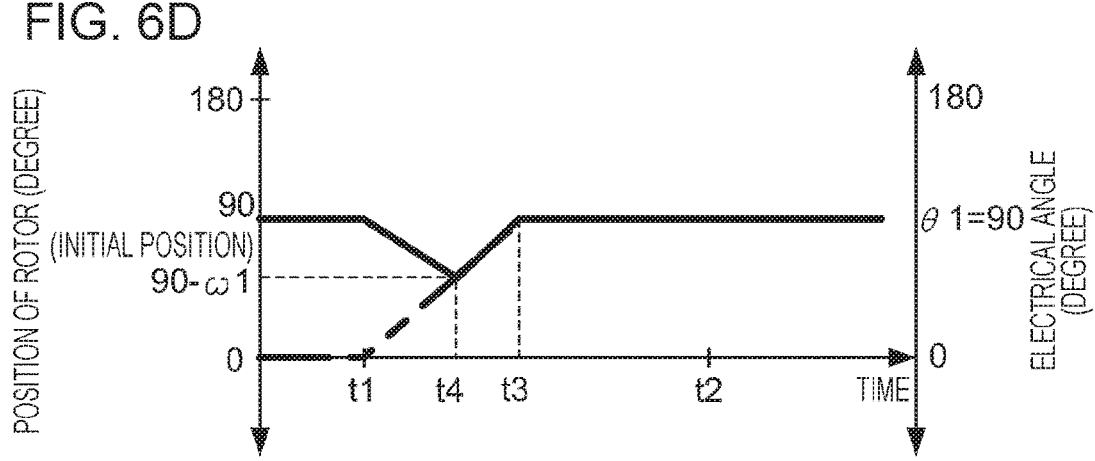

FIGS. 6A to 6D illustrate example changes in the d-axis current and so on in the initial-position detection control. FIG. 6A illustrates a graph in which the horizontal axis represents time and the vertical axis represents the d-axis current (A: ampere), FIG. 6B illustrates a graph in which the horizontal axis represents time and the vertical axis represents the electrical angle (degree), and FIG. 6C illustrates a graph in which the horizontal axis represents time and the vertical axis represents the amount of rotation of the rotor 11 (degree). FIG. 6D illustrates a graph in which the horizontal axis represents time and the two vertical axes represent the position of the rotor 11 (degree) and the electrical angle (degree).

In this exemplary embodiment, the south pole of a magnetic field that is generated when the electrical angle is 0 degree is positioned in the right direction. Therefore, in the case where the electrical angle is 0 degree, the north pole of the rotor 11 is attracted to the south pole of the magnetic field and points in the right direction, that is, the direction of 0 degree described above. In a case where the electrical angle matches an angle that indicates the position of the north pole of the rotor 11, the north pole of the rotor 11 and the south pole of the rotating magnetic field are positioned in the same direction.

Regarding the angle represented by the vertical axis, it is assumed that that angles above the origin are positive (plus) angles, angles below the origin are negative (minus) angles, the upward direction represents the positive direction, and the downward direction represents the negative direction. The d-axis current changes such that the d-axis current is 0 (A) until time t1, X (A) from time t1 to time t2, and 0 (A) after time t2. The electrical angle is 0 (degree) until time t1, gradually changes from time t1, reaches θ1 (degrees) at time t3, and is fixed to θ1 (degrees) after time t3.

Figure 7A:
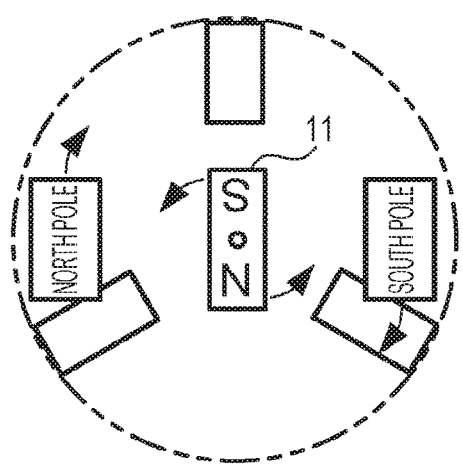
FIGS. 7A to 7C are diagrams illustrating an example state where the rotor rotates in initial-position detection control.
Figure 7B:
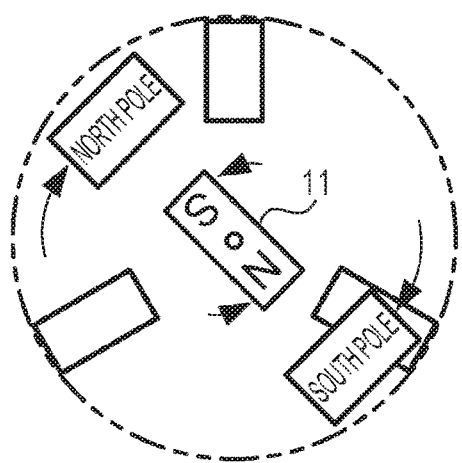
Figure 7C:
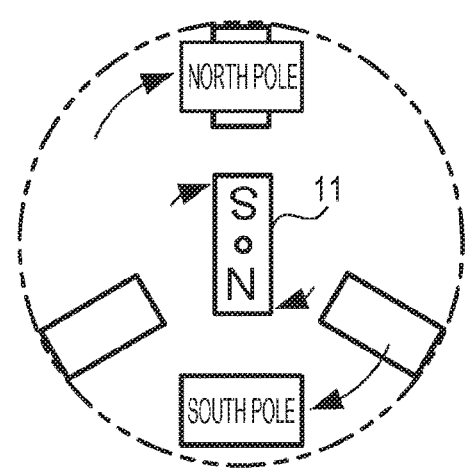

FIGS. 7A to 7C illustrate an example state where the rotor 11 rotates in the initial-position detection control. In this example, a position of the rotor 11 in which the north pole of the rotor 11 points in the direction of 90 degrees (downward direction) is the initial position. When the d-axis current rises at time t1, currents flow through the coils 13, and magnetic poles by a rotating magnetic field are generated, as illustrated in FIG. 7A. The rotor 11 is attracted to the magnetic poles of the rotating magnetic field and starts rotating (in this example, the rotor 11 rotates counterclockwise). At the same time, the electrical angle gradually changes from time t1, and therefore, the magnetic poles of the rotating magnetic field also start rotating (in this example, the magnetic poles of the rotating magnetic field rotate clockwise).

When the rotor 11 further rotates counterclockwise and the magnetic poles of the rotating magnetic field further rotate clockwise, the rotor 11 reaches a position in which the north pole of the rotor 11 and the south pole of the rotating magnetic field face each other and the south pole of the rotor 11 and the north pole of the rotating magnetic field face each other, as illustrated in FIG. 7B. If it is assumed that the inertial force of the rotor 11 is so small that attention need not be paid, the rotor 11 follows the magnetic poles of the rotating magnetic field from this position and rotates in the same direction, that is, clockwise, as illustrated in FIG. 7C.

FIG. 6C illustrates a state where the rotor 11 rotates counterclockwise from time t1 to time t4 until the amount of rotation reaches $\bar{\omega}1$, and the rotor 11 rotates clockwise from time t4 to time t3 for the same amount of rotation $\bar{\omega}1$. The initial-position detection controller 320 stops gradually changing the instruction value of the electrical angle that is supplied to the converter 316 via the fourth switch 324 at time t4, and supplies an instruction value of the electrical angle that is fixed to the value at the time point of time t4. As a result, the electrical angle gradually changes from time t1 to time t3, reaches θ1 at time t3, and is thereafter fixed to θ1, as illustrated in FIG. 6B.

The electrical angle is fixed, and therefore, the positions of the magnetic poles of the rotating magnetic field are also fixed. At this time, the rotor 11 returns to the original position, that is, the initial position, as illustrated in FIG. 7C, because the amount of rotation $\bar{\omega}1$ in a first direction (counterclockwise) matches the amount of rotation $\bar{\omega}1$ in a second direction (clockwise), which is opposite the first direction.

FIG. 6D is a superimposed graph in which changes in the position of the rotor 11 thus rotates and changes in the electrical angle are illustrated. When the electrical angle starts gradually changing from 0 degree, the rotor 11 is in the initial position (the position in which the north pole points in the direction of 90 degrees (downward direction)). When the electrical angle changes and reaches (90−$\bar{\omega}1$) degrees at time t4, the position of the rotor 11 matches the electrical angle. This indicates that a state (the state illustrated in FIG. 7B) occurs where the north pole of the rotor 11 and the south pole of the rotating magnetic field are positioned in the same direction, as described above.

After time t4, the position of the rotor 11 changes while following the positions of the magnetic poles of the rotating magnetic field. When the position of the rotor 11 returns to the initial position at time t3, changes in the electrical angle end, and the rotor 11 stops at the initial position. This following by the rotor 11 usually involves a delay and an excess due to inertia (that is, the rotor 11 continues rotating for a while even if the magnetic field stops rotating); however, for giving easily understandable description, it is assumed in this exemplary embodiment that such a delay and an excess are so small that attention need not be paid.

As described above, the target speed setting unit 303, the rotation speed calculator 305, the speed controller 306, the motor driver 311, the current detector 312, the converter 313, the q-axis current controller 314, the d-axis current controller 315, the converter 316, the initial-position detection controller 320, the first switch 321, the second switch 322, the third switch 323, and the fourth switch 324 function as a rotating-magnetic-field controller 330 that specifies currents to be provided to the coils 13 of the brushless motor 1 to control a rotating magnetic field generated by the coils 13 in the initial-position detection control. The rotating-magnetic-field controller 330 is an example of a "controller" in exemplary embodiments of the present invention.

The rotating-magnetic-field controller 330 performs change control for gradually changing the electrical angle of the rotating magnetic field generated by the coils 13 as described above. The rotating-magnetic-field controller 330 detects, as the initial position of the rotor 11, a position in which the rotor 11 faces the magnetic poles (more specifically, a position in which one of the magnetic poles of the rotor 11 faces one of the generated magnetic poles that is magnetically opposite the one of the magnetic poles of the rotor 11, and the other magnetic pole of the rotor 11 faces the other generated magnetic pole that is magnetically opposite the other magnetic pole of the rotor 11) that are generated at an electrical angle when the rotation direction indicated by the rotation information (the rotation signal from the encoder 20 in this exemplary embodiment) obtained during the change control changes from the first direction (the counterclockwise direction in the example in FIGS. 7A to 7C) to the second direction (the clockwise direction in the example in FIGS. 7A to 7C) and the difference between the amount of rotation in the first direction (hereinafter referred to as a "first amount of rotation") and the amount of rotation in the second direction (hereinafter referred to as a "second amount of rotation") becomes zero, that is, when the first amount of rotation is equal to the second amount of rotation.

The above-described change control (control for gradually changing the electrical angle of the rotating magnetic field) is control performed by the q-axis current controller 314, the d-axis current controller 315, the initial-position detection controller 320, the first switch 321, the second switch 322, the third switch 323, and the fourth switch 324 of the rotating-magnetic-field controller 330 in a cooperative manner, and these functional units function as an initial-position detector 340 that detects the initial position of the rotor 11.

The rotating-magnetic-field controller 330 ends the change control and fixes the electrical angle when the initial position of the rotor 11 is detected, that is, when the first amount of rotation matches the second amount of rotation. When the electrical angle is fixed at this timing, the rotor 11 that is rotating during the change control stops at the initial position. The rotating-magnetic-field controller 330 controls the rotating magnetic field on the basis of the initial position of the rotor 11 thus detected and the rotor 11 stopped at the initial position.

Specifically, the rotating-magnetic-field controller 330 makes the rotor 11 start rotating by providing to the coils 13 currents at an electrical angle obtained by adding/subtracting, in accordance with the rotation direction, a phase of 90 degrees to/from an electrical angle when the above-described amounts of rotation match each other (an electrical angle for generating magnetic poles at the positions of the magnetic poles of the rotor 11 in the initial position). Further, the rotating-magnetic-field controller 330 controls the rotation speed, the rotation position, and so on while detecting the position of the rotor 11 by adding/subtracting, in accordance with the rotation direction, the amount of rotation indicated by the rotation signal output from the encoder 20 to/from the initial position of the rotor 11.

The motor control device 30 performs a detection process for detecting the initial position of the rotor 11 on the basis of the configuration described above.

FIG. 8 illustrates an example operation procedure of the motor control device 30 in the detection process. This operation procedure is started when the power of the brushless motor 1 is turned on.

First, the motor control device 30 provides currents to the coils 13 to generate a rotating magnetic field (step S11) and starts changing the electrical angle (step S12). Next, the motor control device 30 adds up an amount of rotation in the first direction (the direction in which the rotor 11 rotates first) indicated by a rotation signal obtained from the encoder 20 as the first amount of rotation (step S13). Subsequently, the motor control device 30 determines whether the rotation direction has changed (step S14). If the motor control device 30 determines that the rotation direction has not changed (No in step S14), the flow returns to step S13, and the operation is repeated.

If the motor control device 30 determines that the rotation direction has changed (Yes in step S14), the motor control device 30 adds up an amount of rotation in a second direction (the direction opposite the first direction) indicated by an obtained rotation signal as the second amount of rotation (step S21). Subsequently, the motor control device 30 determines whether the difference between the added-up first amount of rotation and the added-up second amount of rotation becomes zero (that is, whether the first amount of rotation matches the second amount of rotation) (step S22). If the motor control device 30 determines that the first amount of rotation does not match the second amount of rotation (No in step S22), the flow returns to step S21, and the operation is repeated. If the motor control device 30 determines that the first amount of rotation matches the second amount of rotation (Yes in step S22), the motor control device 30 stops changing the electrical angle (step S23) and detects the initial position of the rotor 11 (step S24). Then, the operation procedure ends.

The initial position of the rotor 11 may be detected by using a method in which a magnetic field is generated while the electrical angle is fixed and the initial position is detected from the amount of rotation of the rotor 11 until the rotor 11 is attracted to the generated magnetic poles, for example. With this method, however, the rotor 11 rotates 180 degrees at the maximum. As the amount of rotation of the rotor 11 increases, the amount of change in the position of the load increases. This may increasingly likely to cause inconvenience, such as an unexpected collision. Therefore, it is desirable to decrease the amount of rotation of the rotor 11 in the case of detecting the initial position.

In this exemplary embodiment, in the case of detecting the initial position, the rotor 11 is rotated by generating a magnetic field. However, the electrical angle is gradually changed, and therefore, the rotor 11 rotates up to a position short of a position that corresponds to the initial positions of the magnetic poles of the generated magnetic field (in the example in FIGS. 7A to 7C, the positions of the magnetic poles of the rotating magnetic field illustrated in FIG. 7A). Accordingly, the amount of rotation of the rotor in the case of detecting the initial position of the rotor of the brushless motor becomes smaller than that in the case where the positions of the magnetic poles generated in the case of detecting the initial position are fixed (the electrical angle is fixed).

Further, in this exemplary embodiment, the change control is ended, that is, the electrical angle is fixed, when the initial position of the rotor 11 is detected, and the rotor 11 is stopped at the initial position. Accordingly, the load 2 returns to the position at the time of the previous stop. Therefore, when the control of the load 2 is restarted, a trouble is less likely to occur than in a case where the position of the load 2 shifts from the position at the time of the stop because of the change control being not ended even if the initial position is detected, for example.

2. Modifications

The above-described exemplary embodiment is only an exemplary embodiment of the present invention, and modifications may be made as follows. Further, the exemplary embodiment and the modifications may be combined and implemented as appropriate.

2-1. Difference Threshold

In the exemplary embodiment, it is assumed that a delay and an excess in the following of the magnetic poles of the rotating magnetic field by the rotor 11 are so small that attention need not be paid. In this modification, it is assumed that such a delay and an excess occur. In this case, the rotating-magnetic-field controller 330 may detect, as the initial position of the rotor 11, a position in which the rotor 11 faces the magnetic poles that are generated at an electrical angle when the rotation direction indicated by the rotation information obtained during the change control changes from the first direction to the second direction and the difference between the first amount of rotation and the second amount of rotation is smaller than a difference threshold, and may end the change control and fix the electrical angle when the initial position is detected. The difference threshold is an example of a "first threshold" in exemplary embodiments of the present invention. When the difference threshold is set to "0", the initial position is detected in a case where the first amount of rotation matches the second amount of rotation as in the exemplary embodiment described above.

Figure 9A:
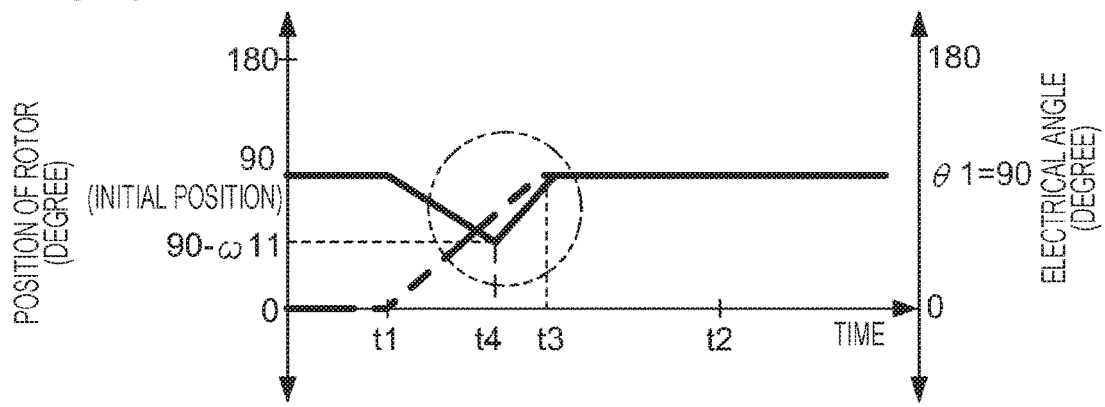
FIGS. 9A to 9C are diagrams illustrating example changes in the position of the rotor and an electrical angle in initial-position detection control according to a modification.
Figure 9B:
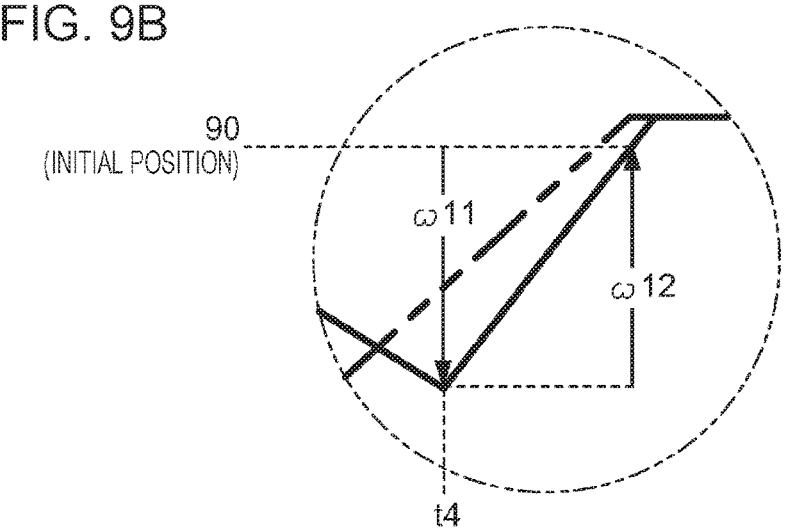
Figure 9C:
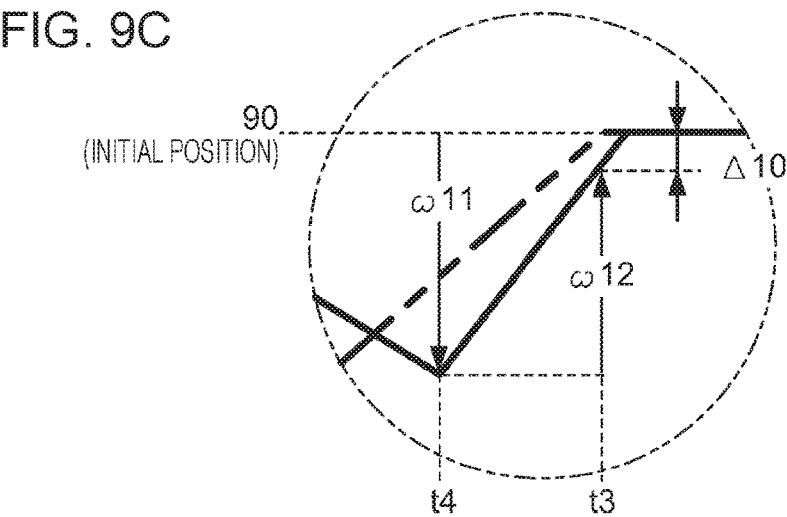

FIGS. 9A to 9C illustrate example changes in the position of the rotor 11 and the electrical angle in initial-position detection control according to this modification. FIGS. 9A to 9C illustrate graphs in which the horizontal axis represents time and the two vertical axes represent the position of the rotor 11 (degree) and the electrical angle (degree), as in FIG. 6D. FIG. 9A illustrates a state where a rotating magnetic field is generated and the electrical angle starts changing at time t1, the rotor 11 rotates in the first direction until time t4 by $\overline{\omega}11$ from the initial position, which is set at 90 degrees, the rotation direction is changed to the second direction, and the electrical angle stops changing at time t3.

In this example, the rotor 11 rotates to a position in which the magnetic poles thereof face the magnetic poles of the rotating magnetic field for which change control is being performed, and thereafter, the rotor 11 continues rotating in the first direction for a while due to inertia, and the rotation direction is changed to the second direction. Therefore, this following by the rotor 11 involves a delay. In this case, if the change control is ended when the first amount of rotation $\overline{\omega}11$ matches the second amount of rotation $\overline{\omega}12$, there is still a delay when the change control is ended, as illustrated in FIG. 9B.

Accordingly, at the electrical angle when the change control is ended, magnetic poles are generated at positions that correspond to a position beyond the initial position of the rotor 11 in the second direction, and therefore, the rotor 11 rotates up to the position, that is, rotates beyond the initial position, and stops. On the contrary, FIG. 9C illustrates an example of the case where the initial position is detected when the difference between the first amount of rotation and the second amount of rotation becomes smaller than the threshold as described above.

In the example in FIG. 9C, the rotating-magnetic-field controller 330 detects, as the initial position of the rotor 11, a position in which the rotor 11 faces the magnetic poles that are generated at an electrical angle when the difference between the first amount of rotation $\overline{\omega}11$ and the second amount of rotation $\overline{\omega}12$ becomes smaller than a threshold $\Delta 10$ (at time t3 in this example). At the time point of time t3, the rotor 11 does not yet return to the initial position. In this modification, changes in the electrical angle are stopped before the rotor 11 returns to the initial position by taking into consideration the delay. Accordingly, the positions of the magnetic poles of the rotor 11 in the initial position are made closer to the positions of the magnetic poles of the rotating magnetic field than in the example in FIG. 9B.

2-2. Strength of Rotating Magnetic Field

In the exemplary embodiment, the value of the d-axis current during the change control (control for gradually changing the electrical angle of the rotating magnetic field) is constant as illustrated in FIG. 6A, and therefore, the strength of the rotating magnetic field is also constant; however, the strength of the rotating magnetic field is not limited to this and may be changed. The rotating-magnetic-field controller 330 may specify currents that are provided to the coils 13 so as to gradually increase the strength of the rotating magnetic field during the change control, for example.

Figure 10A:
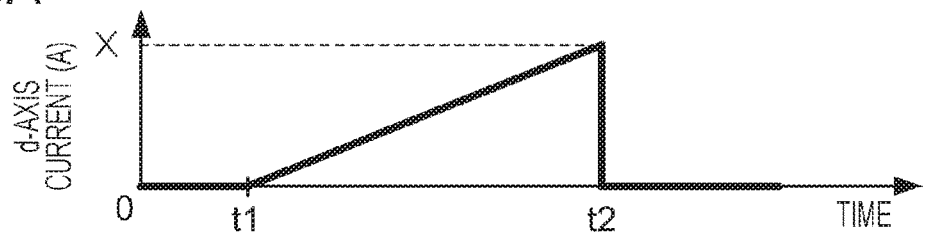
FIGS. 10A and 10B are diagrams illustrating example changes in a d-axis current and so on according to a modification.
Figure 10B:
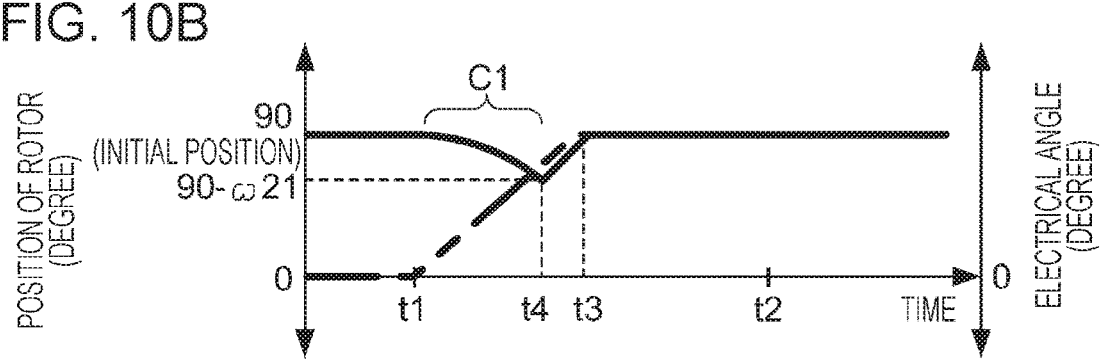

FIGS. 10A and 10B illustrate example changes in the d-axis current and so on according to this modification. In this example, the rotating-magnetic-field controller 330 specifies the d-axis current such that the d-axis current gradually increases from zero to X (ampere) over a period from time t1 to time t2 during which a rotating magnetic field is generated, as illustrated in FIG. 10A. In this case, the force of the magnetic poles of the rotating magnetic field attracting the rotor 11 gradually increases, and therefore, the position of the rotor 11 gradually changes over the period C1 from time t1 to time t4, as illustrated in FIG. 10B. As a result, the amount of rotation of the rotor 11 during initial-position detection control (that is, during a period until the initial position is detected) is smaller than that in the case where the d-axis current of X (ampere) is provided from the beginning, that is, in the case where the strength of the rotating magnetic field is not changed.

2-3. Change in Strength of Rotating Magnetic Field Stopped in the Middle

In the case where the strength of the rotating magnetic field is changed during the change control (control for gradually changing the electrical angle of the rotating magnetic field) as described above, changes in the strength of the rotating magnetic field may be stopped at a certain time point. If the strength of the rotating magnetic field continues increasing when the rotor 11 rotates in the second direction, the rotation speed of the rotor 11 that follows the magnetic poles of the rotating magnetic field continues increasing, and the rotor 11 may over-rotate in the second direction due to inertial force even after rotation of the rotating magnetic field has ended and the following by the rotor 11 has ended.

Figure 11:
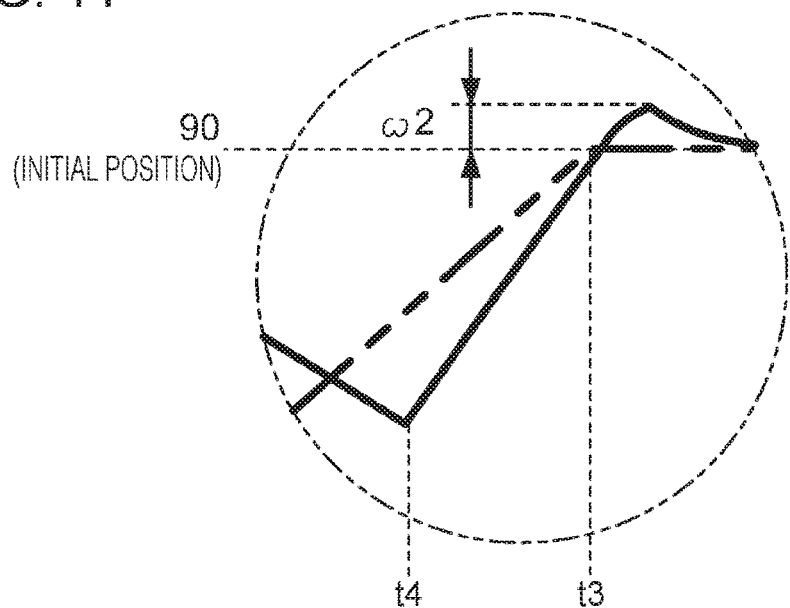
FIG. 11 is a diagram illustrating an example in which the rotor over-rotates in a second direction.

FIG. 11 illustrates an example in which the rotor 11 over-rotates in the second direction. In the example in FIG. 11, the rotation direction of the rotor 11 changes to the second direction at time t4, and the change control ends at time t3. The rotor 11 rotates beyond a position in which the rotor 11 faces the magnetic poles generated at an electrical angle when the change control ends (in this example, it is assumed that the position matches the initial position). When the rotor 11 rotates beyond the initial position by an amount of rotation $\overline{\omega}2$, the rotation direction changes to the first direction, and the rotor 11 rotates closer to the initial position again.

In order to suppress such over-rotation of the rotor 11, the rotating-magnetic-field controller 330 may specify currents that are provided to the coils 13 so as to gradually increase the rotating magnetic field until the rotation direction of the rotor 11 switches from the first direction to the second direction, for example.

Figure 12:
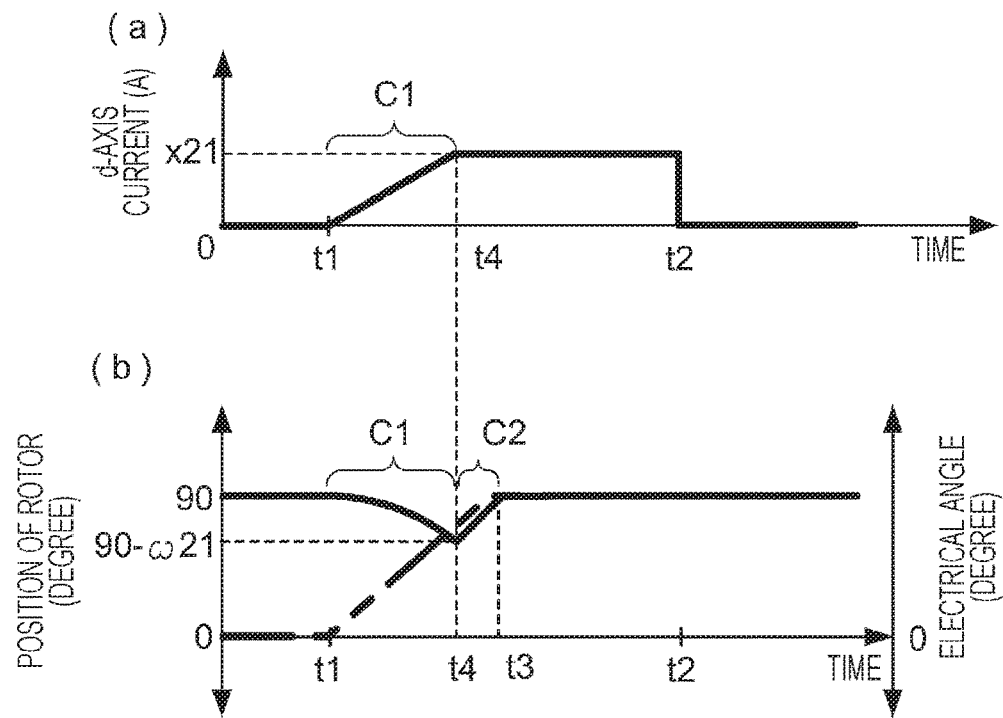
FIG. 12 is a diagram illustrating example changes in a d-axis current and so on according to a modification.

FIG. 12 illustrates example changes in the d-axis current and so on according to this modification. In this example, the rotating-magnetic-field controller 330 specifies the d-axis current so as to gradually increase the d-axis current over the period C1 from time t1 until when the rotation direction of the rotor 11 switches from the first direction to the second direction during which a rotating magnetic field is generated and, after the period C1, to fix the d-axis current to a magnitude (X21 ampere) at the end of the period C1, as illustrated in (a) of FIG. 12.

In this case, the amount of rotation of the rotor 11 in the first direction during the period C1 is the same as that in the example in FIG. 10B and is $\overline{\omega}21$. Thereafter, the strength of the rotating magnetic field generated during the period C2 from time t4 to time t3 becomes smaller than in the case where the d-axis current continues increasing and the strength of the rotating magnetic field continues increasing even if the rotation direction of the rotor 11 switches. Therefore, the amount of over-rotation of the rotor 11 in the second direction decreases, and the amount of rotation of the rotor 11 during the entire period in which the initial-position detection control is performed also decreases.

The timing at which changes in the strength of the rotating magnetic field are stopped is not limited to the above-described timing. For example, the rotating-magnetic-field controller 330 may specify currents that are provided to the coils 13 so as to gradually increase the strength of the rotating magnetic field until the amount of rotation in the first direction (the first amount of rotation) indicated by a rotation signal obtained by the encoder output obtaining unit 304 during the change control reaches a predetermined amount-of-rotation threshold. This amount-of-rotation threshold is an example of a "second threshold" in exemplary embodiments of the present invention.

Figure 13:
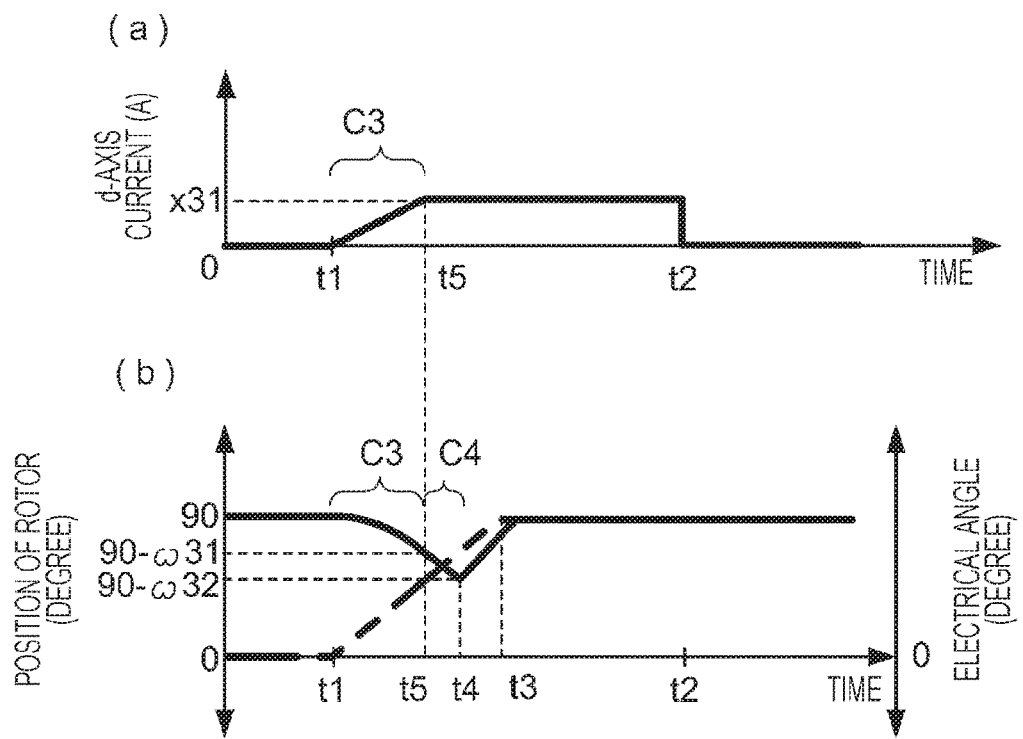
FIG. 13 is a diagram illustrating example changes in a d-axis current and so on according to a modification.

FIG. 13 illustrates example changes in the d-axis current and so on according to this modification. In this example, the rotating-magnetic-field controller 330 specifies the d-axis current so as to gradually increase the d-axis current over the period C3 from time t1 to time t5 in a period from time t1 to time t2 during which a rotating magnetic field is generated, as illustrated in (a) of FIG. 13. Time t5 is a time when the first amount of rotation reaches a rotation-of-amount threshold $\overline{\omega}31$, as illustrated in (b) of FIG. 13.

In this case, in the period C4 from when the period C3 ends until time t4 at which the rotation direction of the rotor 11 changes to the opposite direction, the strength of the rotating magnetic field does not increase any more and is fixed. Therefore, the amount of rotation of the rotor 11 during the period C4 becomes smaller than that in the case where the strength of the rotating magnetic field continues increasing. Accordingly, the amount of over-rotation described above is smaller, and the amount of rotation of the rotor 11 during the entire period in which the initial-position detection control is performed also becomes smaller than those in the case where the strength of the rotating magnetic field continues increasing even if the first amount of rotation reaches the amount-of-rotation threshold.

2-4. Resistance to Rotation

In the case of gradually increasing the strength of the rotating magnetic field by changing the d-axis current, as described in the above examples, resistance to the rotation of the rotor 11 may be taken into consideration. Resistance to the rotation of the rotor 11 increases as the load 2 is heavier, and increases as frictional resistance experienced by the load 2 is larger, for example. As resistance to the rotation of the rotor 11 increases, the rotation speed at which the rotor 11 is attracted to the magnetic poles of the rotating magnetic field decreases. This rotation speed is represented by the increase rate of the amount of rotation.

The rotating-magnetic-field controller 330 performs control of the strength of the rotating magnetic field that takes into consideration the above-described resistance by using, for example, a d-axis current table in which the increase rate of the first amount of rotation is associated with the d-axis current at time t2.

Figures 14A, 14B:
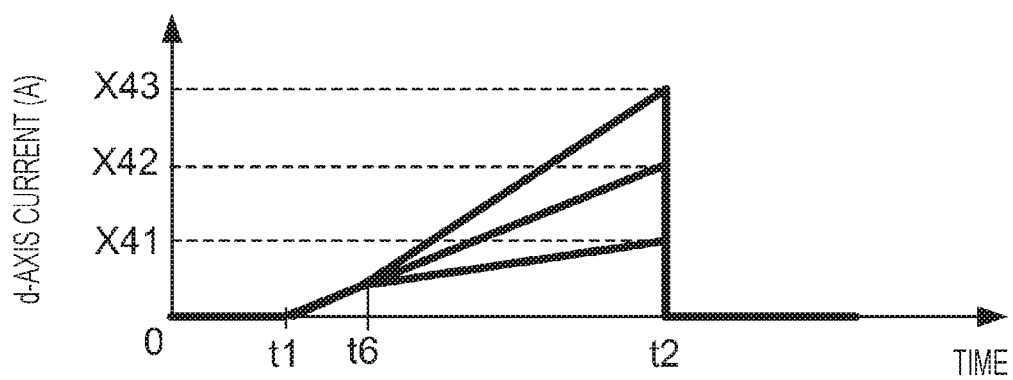
FIGS. 14A and 14B are diagrams illustrating example control of a d-axis current.

FIGS. 14A and 14B illustrate example control of the d-axis current. FIG. 14A illustrates a d-axis current table in which values of the increase rate of the first amount of rotation, namely, "smaller than Th11", "equal to or larger than Th11 and smaller than Th12", and "equal to or larger than Th12", are respectively associated with values of the d-axis current (A: ampere) at time t2, namely, "X43", "X42", and "X41" (X41<X42<X43).

The rotating-magnetic-field controller 330 calculates the increase rate of the first amount of rotation from the first amounts of rotation indicated by rotation signals obtained by the encoder output obtaining unit 304 during a period from the start of change control until a predetermined time, and changes the d-axis current until the value of the d-axis current reaches a value that is associated with the calculated increase rate in the d-axis current table. In this example, the rotating-magnetic-field controller 330 calculates the increase rate of the first amount of rotation from time t1 to time t6 and changes the d-axis current so that the value of the d-axis current at time t2 is X43, X42, or X41, as illustrated in FIG. 14B.

In the example illustrated in FIGS. 14A and 14B, the rotating-magnetic-field controller 330 specifies the currents that are provided to the coils 13 so that the increase rate of the strength of the rotating magnetic field decreases as the increase rate of the first amount of rotation indicated by rotation signals obtained by the encoder output obtaining unit 304 during the change control increases. When the increase rate of the first amount of rotation is high, that is, when the rotation speed of the rotor 11 is high, resistance to the rotation of the rotor 11 described above is small.

As the resistance is smaller, the amount of rotation of the rotor 11 during initial-position detection control is larger. Therefore, if the increase rate of the strength of the rotating magnetic field is constant, the amount of rotation of the rotor 11 varies depending on the magnitude of the resistance. In the example in FIGS. 14A and 14B, the increase rate of the strength of the rotating magnetic field is made lower as the increase rate of the first amount of rotation increases (as the resistance to the rotation of the rotor 11 decreases), as described above. Accordingly, the amount of rotation of the rotor 11 during the initial-position detection control varies to a smaller degree than in the case where the increase rate of the strength is constant.

In the case of gradually increasing the strength of the rotating magnetic field until the first amount of rotation reaches the amount-of-rotation threshold, as described with reference to the example in FIG. 13, the rotating-magnetic-field controller 330 may decrease the amount-of-rotation threshold as the increase rate of the first amount of rotation (the rotation speed of the rotor 11) indicated by rotation signals obtained by the encoder output obtaining unit 304 during the change control increases. The rotating-magnetic-field controller 330 performs this control of the strength of the rotating magnetic field by using, for example, an amount-of-ration threshold table in which the increase rate of the first amount of rotation is associated with the amount-of-rotation threshold.

FIG. 15 illustrates an example of the amount-of-rotation threshold table. FIG. 15 illustrates an amount-of-rotation threshold table in which values of the increase rate of the first amount of rotation, namely, "smaller than Th11", "equal to or larger than Th11 and smaller than Th12", and "equal to or larger than Th12", are respectively associated with values of the amount-of-rotation threshold, namely, "Th53", "Th52", and "Th51" (Th51<Th52<Th53). The rotating-magnetic-field controller 330 changes the d-axis current until the first amount of rotation reaches a value of the amount-of-rotation threshold that is associated with the increase rate of the first amount of rotation calculated as in the example in FIGS. 14A and 14B in the amount-of-rotation threshold table.

In the example in FIG. 15, the amount-of-rotation threshold decreases as the increase rate of the first amount of rotation increases (as resistance to the rotation of the rotor 11 decreases) as described above. If the amount-of-rotation threshold is small, strengthening of the rotating magnetic field ends earlier than in a case where the amount-of-rotation threshold is large, and therefore, the rotating magnetic field is fixed to a state where the rotating magnetic field is weak. Accordingly, even if resistance to the rotation of the rotor 11 is small, the rotating magnetic field is weak, and therefore, the amount of rotation is made smaller. As a result, the amount of rotation of the rotor 11 during the initial-position detection control varies to a smaller degree than in the case where the amount-of-ration threshold is constant.

In the case of gradually increasing the strength of the rotating magnetic field until the difference between the first amount of rotation and the second amount of rotation is smaller than the difference threshold, as described with reference to the example in FIGS. 9A to 9C, the rotating-magnetic-field controller 330 may decrease the difference threshold as the increase rate of the first amount of rotation indicated by rotation signals obtained by the encoder output obtaining unit 304 during the change control increases. The rotating-magnetic-field controller 330 performs this control of the strength of the rotating magnetic field by using, for example, a difference threshold table in which the increase rate of the first amount of rotation is associated with the difference threshold.

FIG. 16 illustrates an example of the difference threshold table. FIG. 16 illustrates a difference threshold table in which values of the increase rate of the first amount of rotation, namely, "smaller than Th11", "equal to or larger than Th11 and smaller than Th12", and "equal to or larger than Th12", are respectively associated with values of the difference threshold, namely, "Th63", "Th62", and "Th61" (Th61<Th62<Th63). The rotating-magnetic-field controller 330 calculates the increase rate of the first amount of rotation as in the example in FIG. 12 and uses a difference threshold that is associated with the calculated increase rate in the difference threshold table to increase the strength of the rotating magnetic field.

As the rotation speed of the rotor 11 increases, the rotor 11 follows the magnetic poles of the rotating magnetic field to a larger degree, that is, the rotor 11 is likely to follow the magnetic poles of the rotating magnetic field with a shorter delay. Therefore, the difference threshold is made smaller as the rotation speed of the rotor 11 increases, as in the example of FIG. 16. Accordingly, the shifts between the positions of the magnetic poles of the rotor 11 in the initial position and the positions of the magnetic poles of the rotating magnetic field at an electrical angle when the change control ends are likely to vary to a smaller degree than in the case where the difference threshold is constant.

2-5. Plural Times of Control

In the exemplary embodiment, once the change control (control for gradually changing the electrical angle of the rotating magnetic field) ends, the initial position is detected on the basis of the electrical angle at the time point of the end; however, change control may be further performed thereafter. In this modification, the rotating-magnetic-field controller 330 performs change control plural times. Specifically, the rotating-magnetic-field controller 330 detects, as the initial position of the rotor 11, a position in which the rotor 11 faces the magnetic poles generated at an electrical angle when the difference between the accumulated value of the first amount of rotation and the accumulated value of the second amount of rotation in the plural times of change control becomes smaller than a difference threshold.

Figure 17A:
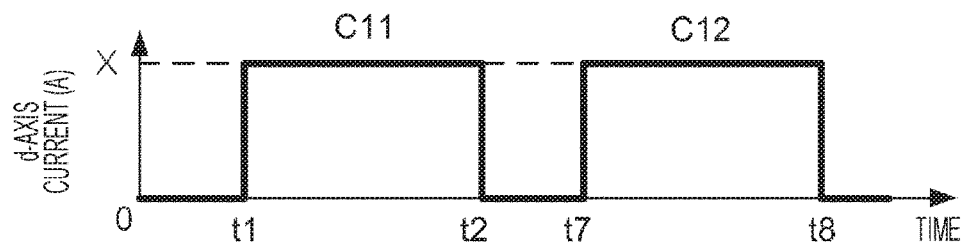
FIGS. 17A to 17C are diagrams illustrating example changes in a d-axis current and so on in initial-position detection control according to a modification.
Figure 17B:
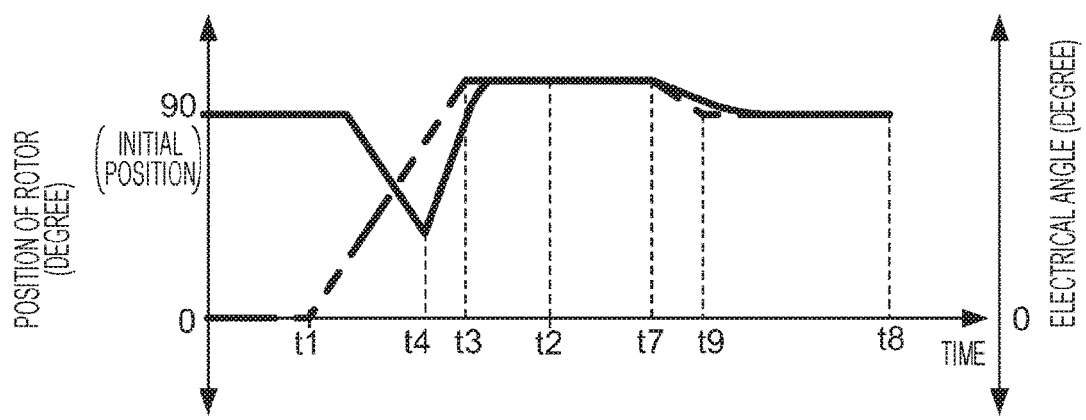
Figure 17C:
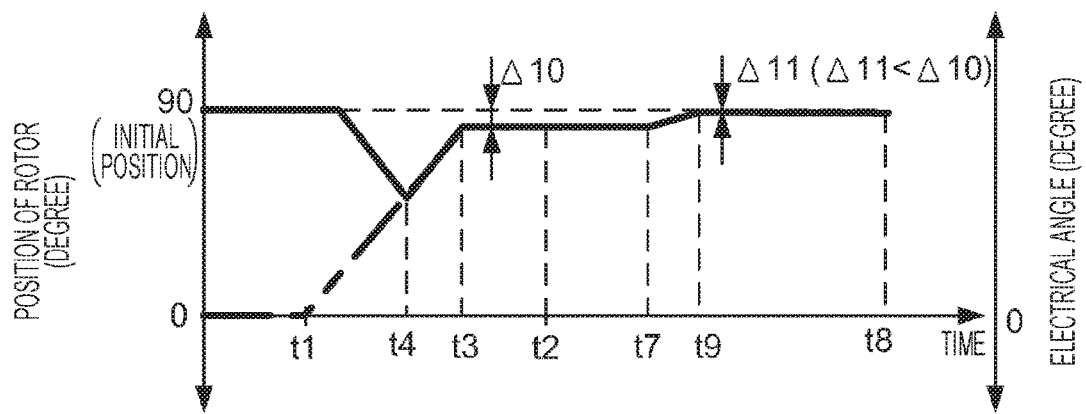

FIGS. 17A to 17C illustrate example changes in the d-axis current and so on in initial-position detection control according to this modification. In this example, the rotating-magnetic-field controller 330 performs change control for gradually changing the electrical angle while setting the d-axis current to X (ampere) during the first period C11 from time t1 to time t2 and the second period C12 from time t7 to time t8, as illustrated in FIG. 17A. FIG. 17B illustrates the position of the rotor 11 and the electrical angle in a case where a delay in the following by the rotor 11 is long.

If a delay in the following by the rotor 11 is long, the magnetic poles of the rotating magnetic field are positioned beyond the initial position of the rotor 11 when the difference between the first amount of rotation and the second amount of rotation is smaller than the difference threshold. Therefore, in the example in FIG. 17B, the electrical angle is fixed at a position beyond the initial position. In this case, at time t7 when the subsequent change control is started, the second amount of rotation is larger than the first amount of rotation, the amounts of rotation being indicated by rotation signals obtained by the encoder output obtaining unit 304, and therefore, the rotating-magnetic-field controller 330 determines that the rotor 11 over-rotates beyond the initial position in the second direction.

The rotating-magnetic-field controller 330 performs control for gradually increasing the electrical angle in the first period C11, and the rotor 11 over-rotates beyond the initial position in the second direction. Therefore, the rotating-magnetic-field controller 330 performs control for gradually decreasing the electrical angle on the contrary in the second period C12. When the difference between the accumulated value of the first amount of rotation and the accumulated value of the second amount of rotation becomes smaller than the difference threshold, the rotating-magnetic-field controller 330 detects the initial position as described above.

In the case where a delay in the following by the rotor 11 is long as in the above-described example, the detected initial position may be apart from the correct initial position by the difference threshold or more. However, if change control is performed plural times, the second and subsequent change control is started at an electrical angle that is closer to the initial position than that in the first change control. Therefore, the initial position is more likely to be detected while a delay in the following by the rotor 11 is short and the initial position is detected more precisely than in the case where change control is performed only once.

In the case of detecting, as the initial position of the rotor 11, a position in which the rotor 11 faces the magnetic poles that are generated at an electrical angle when the difference between the accumulated value of the first amount of rotation and the accumulated value of the second amount of rotation becomes smaller than the difference threshold as described above, the rotating-magnetic-field controller 330 may make the difference threshold in the second and subsequent change control smaller than that in the first change control. If a delay in the following by the rotor 11 is sufficiently short as illustrated in FIG. 17C, for example, a position apart from the initial position by the difference threshold is detected as the initial position.

For example, when a difference threshold Δ10 is used in the first change control and a difference threshold Δ11 smaller than the difference threshold Δ10 (Δ11<Δ10) is used in the second change control, as illustrated in FIG. 17C, a position closer to the correct initial position is detected as the initial position after the second change control than the position detected in the first change control. Also in this case, the initial position is detected more precisely than in the case where change control is performed only once.

2-6. Current Control after Electrical Angle is Fixed

Even if the initial position of the rotor 11 is detected and the electrical angle is fixed, the rotor 11 may stop with the magnetic poles thereof facing the positions shifting from the magnetic poles generated at the electrical angle because, for example, resistance to the rotation of the rotor 11 is large. In this case, the rotating-magnetic-field controller 330 may, after fixing the electrical angle, specify the d-axis current so as to generate a magnetic field stronger than the rotating magnetic field when the change control ends.

Figure 18:
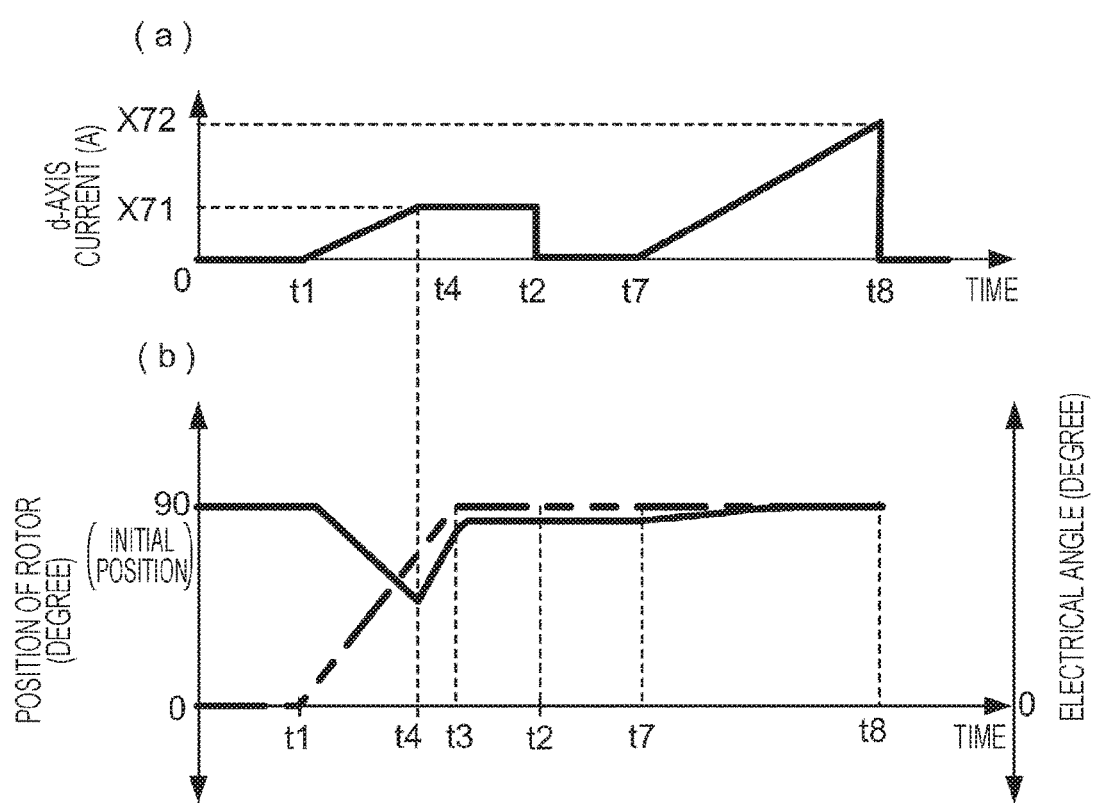
FIG. 18 is a diagram illustrating example changes in a d-axis current and so on according to a modification.

FIG. 18 illustrates example changes in the d-axis current and so on according to this modification. In (a) of FIG. 18, the rotating-magnetic-field controller 330 gradually increases the d-axis current in the period up to time t4 at which the rotation direction of the rotor 11 switches from the first direction to the second direction, as in the example in (a) of FIG. 12, and after the period, fixes the d-axis current to X71, which is the value at time t4, over the period up to time t2. After time t7, the rotating-magnetic-field controller 330 gradually increases the d-axis current until the value of the d-axis current reaches X72, which is larger than X71, X71 being the value of the d-axis current at time t4.

In the example in (b) of FIG. 18, the rotor 11 stops with the magnetic poles thereof facing the positions shifting from the magnetic poles generated at an electrical angle fixed at time t3. At this time point, it is not known whether the detected initial position shifts from the stop position of the rotor 11 or the detected initial position shifts from the correct initial position, and the amounts of these shifts are not known. Therefore, the rotating-magnetic-field controller 330 gradually increases the d-axis current after time t7 as described above.

As a result, a magnetic field stronger than the rotating magnetic field when the change control ends is generated after time t7 and, even in the case where the rotor 11 stops with the magnetic poles thereof facing the positions shifting from the magnetic poles generated at the fixed electrical angle, the rotor 11 is attracted to the magnetic poles generated by the strong magnetic field. The rotor 11 rotates up to a position closer to the detected initial position, as illustrated in (b) of FIG. 18. As described above, according to this modification, the rotor 11 rotates closer to the detected initial position than in the case where the current that generates the strong magnetic field described above is not specified.

As the detected initial position is closer to the correct initial position, the difference between the first amount of rotation and the second amount of rotation after the strong magnetic field has been generated decreases. On the contrary, as the difference between the detected initial position and the correct initial position increases, the difference between the first amount of rotation and the second amount of rotation after the strong magnetic field has been generated may increase.

In a case where the difference between the first amount of rotation and the second amount of rotation indicated by rotation signals that are obtained by the encoder output obtaining unit 304 (those obtained after the start of the change control) increases after a current that generates the strong magnetic field described above has been specified, the rotating-magnetic-field controller 330 may specify a current that generates a magnetic field that rotates the rotor 11 in a direction in which the difference decreases.

Figure 19:
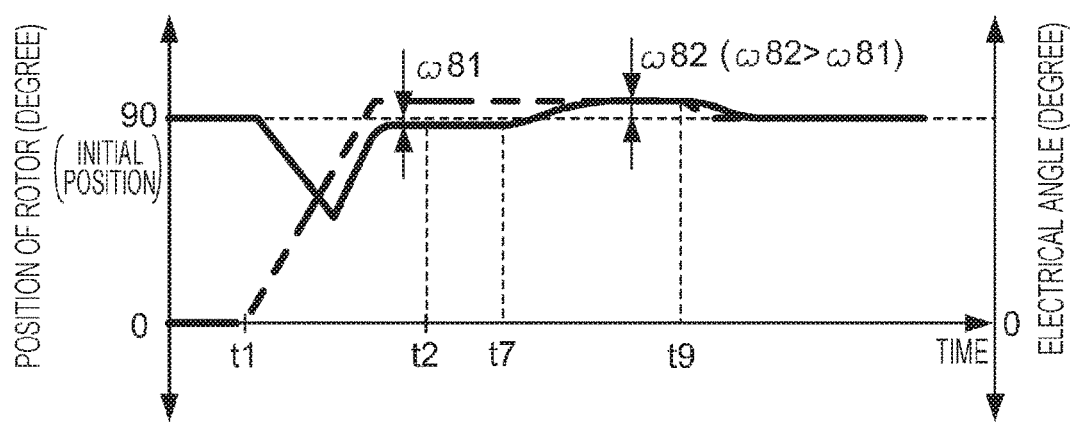
FIG. 19 is a diagram illustrating example changes in the position of the rotor and an electrical angle.

FIG. 19 illustrates example changes in the position of the rotor 11 and the electrical angle. In the example in FIG. 19, a delay in the following by the rotor 11 is long, and therefore, the detected initial position (the position in which the magnetic poles of the rotor 11 face the magnetic poles at the fixed electrical angle) shifts from the correct initial position. Further, resistance to the rotation of the rotor 11 is large, and therefore, the rotor 11 does not rotate up to the detected initial position even at time t2 at which the d-axis current becomes "0" ampere. As a consequence, the rotor 11 stops at a position close to the correct initial position. The shift between the stop position at this time and the correct initial position is referred to as ω81.

When a current that generates the strong magnetic field described above is specified at time t7, which is after time t2, the rotor 11 approaches the detected initial position and stops. When the shift between the stop position at this time and the correct initial position is referred to as ω82, ω81<ω82 is satisfied, that is, the difference between the first amount of rotation and the second amount of rotation increases after the strong magnetic field has been generated in the example in FIG. 19.

Thereafter, the rotating-magnetic-field controller 330 generates a magnetic field that rotates the rotor 11 in a direction in which the difference between the first amount of rotation and the second amount of rotation decreases from time t9, and the rotor 11 approaches the initial position again and stops. The rotating-magnetic-field controller 330 performs control for decreasing the difference as described above so that, even if the rotor 11 is apart from the initial position due to the generated strong magnetic field described above, the rotor 11 approaches the initial position.

2-7. Brushless Motor

The brushless motor is not limited to that described in the exemplary embodiment and may be a brushless motor in which a rotating magnetic field is generated by, for example, two-phase currents or currents in four phases or more instead of three-phase currents. The rotor has one set of magnetic poles (a set of the north pole and the south pole) in the exemplary embodiment; however, the rotor may have two or more sets of magnetic poles. In the exemplary embodiment, the rotor is arranged close to the center and the coils are arranged close to the outside; however, the coils may be arranged close to the center and the rotor may be arranged close to the outside (in the latter case, a cylindrical rotor is used, for example). In either case, the coils may be arranged around the rotor.

2-8. Electrical Angle after Detection of Initial Position

In the exemplary embodiment, the rotating-magnetic-field controller 330 ends the change control and fixes the electrical angle when the difference between the first amount of rotation and the second amount of rotation becomes smaller than the difference threshold, that is, when the initial position of the rotor 11 is detected; however, the rotating-magnetic-field controller 330 is not limited to this. The rotating-magnetic-field controller 330 may continue performing the change control (that is, may continue changing the electrical angle) for a while even if the rotating-magnetic-field controller 330 detects the initial position.

In this case, the rotating-magnetic-field controller 330 needs to decrease the d-axis current to such a degree that the rotor 11 is not attracted to the magnetic poles of the rotating magnetic field after the electrical angle has been fixed. In the case where change control is successively performed plural times as described with reference to FIGS. 17A to 17C, if a period for fixing the electrical angle is not set between change control and subsequent change control, change control is continuously performed after the initial position has been detected (also in the case where the electrical angle is changed in the opposite direction).

2-9. Category of Exemplary Embodiments of the Present Invention

In the exemplary embodiment, the motor control device is built into the brushless motor; however, the motor control device is not limited to this and may be provided outside the brushless motor. Exemplary embodiments of the present invention may be applied to both the built-in motor control device and the external motor control device. Further, an exemplary embodiment of the present invention may be regarded as a brushless motor including the motor control device.

Further, an exemplary embodiment of the present invention may be regarded as an information processing method for implementing processing performed by the motor control device or a program for causing a computer controlling the motor control device to function. The program may be provided in the form of a recording medium, such as an optical disc, in which the program is stored or may be provided in such a form that the program is downloaded to a computer via a communication line, such as the Internet, and is installed so as to be made available.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A control device comprising:
an obtaining unit that obtains rotation information indicating an amount of rotation and a rotation direction of a rotor of a brushless motor; and
a controller that specifies a current that is provided to a coil of the brushless motor to control a rotating magnetic field generated by the coil in such a manner as to perform change control for gradually changing an electrical angle of the rotating magnetic field generated by the coil, to detect, as an initial position of the rotor, a position in which the rotor faces magnetic poles that are generated at an electrical angle when the rotation direction indicated by the rotation information that is obtained during the change control changes from a first direction to a second direction and a difference between an amount of rotation in the first direction and an amount of rotation in the second direction, the amounts of rotation being indicated by the rotation information that is obtained during the change control, becomes smaller than a first threshold, and to control the rotating magnetic field in accordance with the initial position.

2. The control device according to claim 1, wherein
the controller ends the change control and fixes the electrical angle when the difference becomes smaller than the first threshold.

3. The control device according to claim 2, wherein
the controller specifies, after fixing the electrical angle, the current so as to generate a magnetic field stronger than the rotating magnetic field when the change control ends.

4. The control device according to claim 3, wherein
the controller specifies, in a case where the difference indicated by the obtained rotation information increases after specifying the current so as to generate the stronger magnetic field, the current so as to generate a magnetic field that rotates the rotor in a direction in which the difference decreases.

5. The control device according to claim 1, wherein
the controller gradually increases a strength of the rotating magnetic field during the change control.

6. The control device according to claim 5, wherein
the controller decreases a rate of increasing the strength of the rotating magnetic field as an increase rate of the amount of rotation in the first direction indicated by the rotation information that is obtained during the change control increases.

7. The control device according to claim 5, wherein
the controller continues increasing the strength of the rotating magnetic field until the rotation direction of the rotor switches from the first direction to the second direction.

8. The control device according to claim 5, wherein
the controller gradually increases the strength of the rotating magnetic field until the amount of rotation in the first direction indicated by the rotation information that is obtained during the change control reaches a second threshold.

9. The control device according to claim 8, wherein
the controller decreases the second threshold as an increase rate of the amount of rotation in the first direction indicated by the rotation information that is obtained during the change control increases.

10. The control device according to claim 1, wherein
the controller decreases the first threshold as an increase rate of the amount of rotation in the first direction indicated by the rotation information that is obtained during the change control increases.

11. The control device according to claim 1, wherein the controller performs the change control a plurality of times and detects, as the initial position of the rotor, a position in which the rotor faces magnetic poles that are generated at an electrical angle when a difference between an accumulated value of the amount of rotation in the first direction and an accumulated value of the amount of rotation in the second direction becomes smaller than the first threshold.

12. A brushless motor comprising:
the control device according to claim 1;
a rotor; and
a coil that is arranged around the rotor and through which a current controlled by the control device flows.

* * * * *